United States Patent
Maeda

[11] Patent Number: 5,107,243
[45] Date of Patent: Apr. 21, 1992

[54] LEVER SWITCH

[75] Inventor: Takuya Maeda, Furukawa, Japan

[73] Assignee: Alps Electric Co., Ltd., Tokyo, Japan

[21] Appl. No.: 517,090

[22] Filed: May 1, 1990

[30] Foreign Application Priority Data

Aug. 18, 1989 [JP] Japan .................... 1-96087[U]

[51] Int. Cl.⁵ .................................. H01C 10/36
[52] U.S. Cl. ................................ 338/172; 338/163;
338/178; 338/191; 338/198; 200/61.27;
200/61.54
[58] Field of Search ............. 338/172, 194, 163, 184,
338/215, 191, 178, 179, 198, 200; 200/61.27,
61.54

[56] References Cited
U.S. PATENT DOCUMENTS 4,219,706  8/1980  Koch et al. .............. 200/61.54
4,408,104 10/1983  Iwata et al. ............. 200/61.54
4,723,057  2/1988  Lane, Jr. ................ 200/61.27

Primary Examiner—Marvin M. Lateef
Attorney, Agent, or Firm—Guy W. Shoup; David W. Heid

[57] ABSTRACT

A lever switch for a vehicle windshield wiper having a base for attaching to a steering column, a rotational shaft rotatably connected to the base, a first switch knob connected to the rotational shaft, and a second switch knob rotatable mounted around a portion of the rotational shaft. The lever switch includes mounting the switch mechanisms for the first and second switch knobs around a portion of the rotational shaft, thereby allowing the rotational shaft to be shortened and the lever switch to be connected at an angle to the base.

6 Claims, 3 Drawing Sheets

LEVER SWITCH

BACKGROUND OF THE INVENTION

1. Field of the Invention

The present invention relates to lever switches, and particularly to a lever switch for windshield wiper operation for a motor vehicle.

2. Description of the Prior Art

FIG. 3 shows a conventional wiper switch. In this figure, a tubular casing indicated at 1 is mounted in the vicinity of a steering wheel of a motor vehicle not shown. On the mounting base is disposed a switch portion of a front wiper though not shown, and an operating shaft 2 of the switch portion is inserted into the casing 1. The extreme end of the operating shaft 2 is supported while extending through a bearing body 3 secured to an open end of the casing 1, and a knob 4 for operating the front wiper is secured by screw to the projected end thereof. A fixed knob 5 is secured to the extreme end of the bearing body 3, and a cam crest (not shown) is provided on one surface of the fixed knob 5. A clip pin 6 pressed against the cam crest compresses a coil spring 7 and is received into a round hole of the knob 4 for operating the front wiper to thereby constitute a click mechanism. A variable resistor 8 for setting interval time is disposed in the outer periphery of the bearing body 3. A rotational body of the variable resistor 8 is operated by a knob 9 for the interval time set volume, the knob 9 being rotatably loosely fitted in the outer periphery of the bearing body 3. Further, a click mechanism composed of a cam crest, a clip pin and a coil spring as mentioned above is disposed between the knob 9 and the other surface of the fixed knob 5.

According to the above-described conventional wiper switch, when the knob 4 for operating the front wiper is twisted, positions of OFF, interval (INT), LO and HI, for example, are selected by the click mechanism so that the wiper is operated. In cases where the INT position is set, the wiper can be driven intermittently at suitable intervals by rotating the knob 9 for the interval time set variable resistor. Even in the operation of this knob 9, a few positions are selected by the click mechanism.

In the above-described prior art, the switch portion for the front wiper is disposed on the mounting base of the casing 1, and the operating shaft 2 is made to extend through the casing 1. Therefore, this impedes a miniaturization of the whole product and in addition restricts the direction in which the operating shaft 2 is disposed, that is, the operating shaft 2 must be substantially perpendicular to the drive column. Therefore, no freedom is obtained in the mounting place, and no freedom is obtained in the shape of the casing.

SUMMARY OF THE INVENTION

The present invention has been achieved in order to solve the problem associated with the aforesaid prior art. It is an object of the present invention to provide a lever switch which can miniaturize products and increase a freedom of the mounting place and the like.

For achieving the aforesaid object, the present invention provides windshield wiper lever switch comprising a base, a hollow bearing body mounted and secured to said base, a rotational shaft which is inserted into and rotatably supported in said hollow bearing body and of which opposite ends are projected, a lever member fixedly mounted on one projected end of said rotational shaft and being bent in a central direction of said rotational shaft, a first slider receiver having a first slider, said first slider receiver being loosely fitted in the outer periphery of said hollow bearing body so that it is rotated upon rotation of said lever member, a first knob fixedly mounted on the other end of said rotational shaft, a fixed knob portion fixedly mounted in the outer periphery of said hollow bearing body, a first selection mechanism provided between said fixed knob portion and said first knob, a second knob rotatably loosely fitted in the outer periphery of said hollow bearing body, a second selection mechanism provided between said second knob and said fixed knob portion, and a variable resistor provided in the outer periphery of said hollow bearing body and being operated in association with the rotational operation of said second knob.

With the above-described arrangement, the rotational shaft is constructed so as to be contained within the hollow bearing portion and not to reach the mounting portion of the base. Accordingly, the shape of the base can be bent.

Furthermore, the slider receiver operated by the rotational shaft is disposed on the central side of the rotational shaft from the lever member adapted to operate the slider receiver. Therefore, miniaturization of the device can be achieved, and the full length of the hollow bearing body can be extended, the rotation of the rotational shaft is stabilized and the operation feeling of the knob can be enhanced.

BRIEF DESCRIPTION OF THE DRAWINGS

FIG. 2 is an exploded perspective view.

DESCRIPTION OF THE PREFERRED EMBODIMENTS

An embodiment of the present invention will be described hereinafter with reference to FIGS. 1 and 2.

Figure 1:
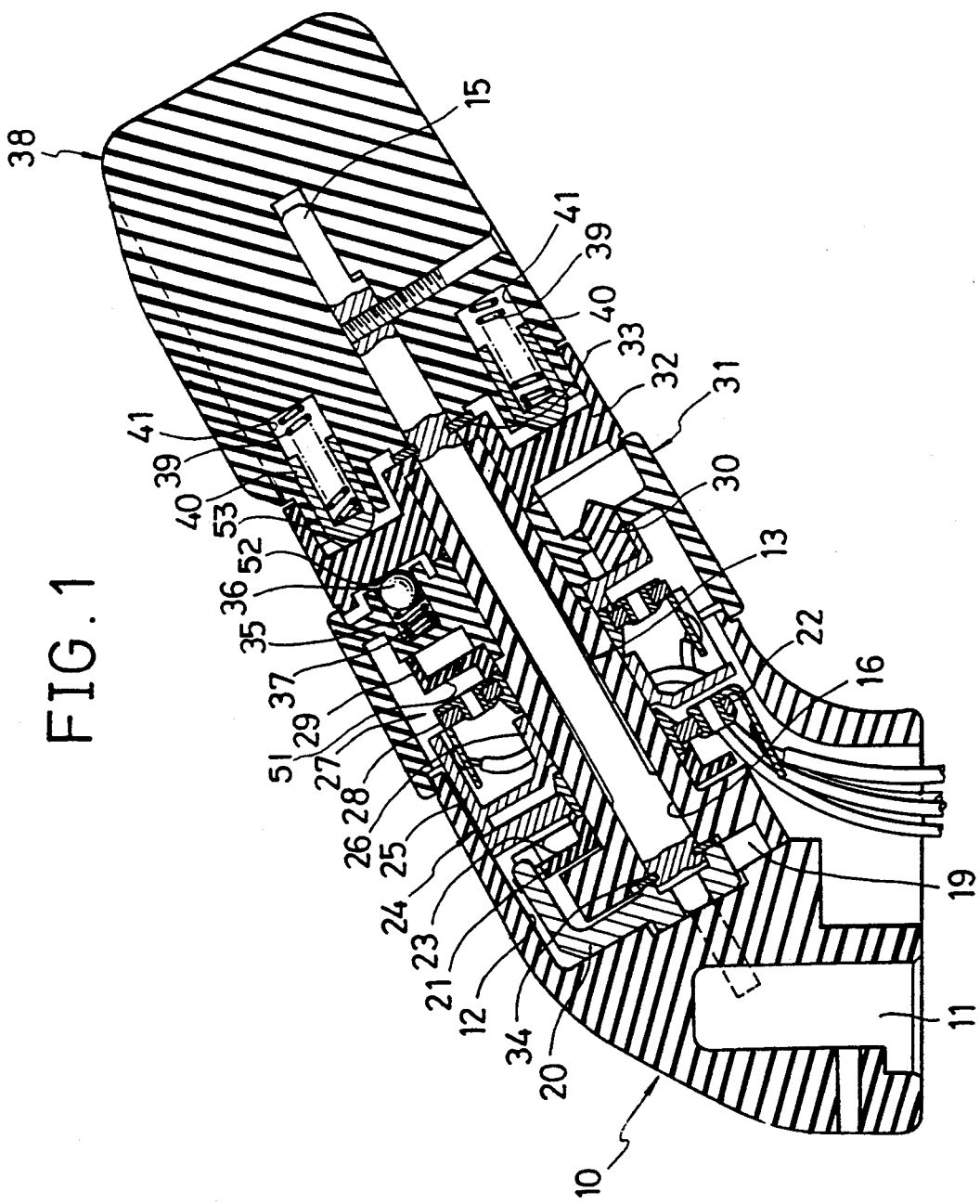
FIGS. 1 and 2 illustrate an embodiment according to the present invention, FIG. 1 being a longitudinal sectional view
Figure 2:
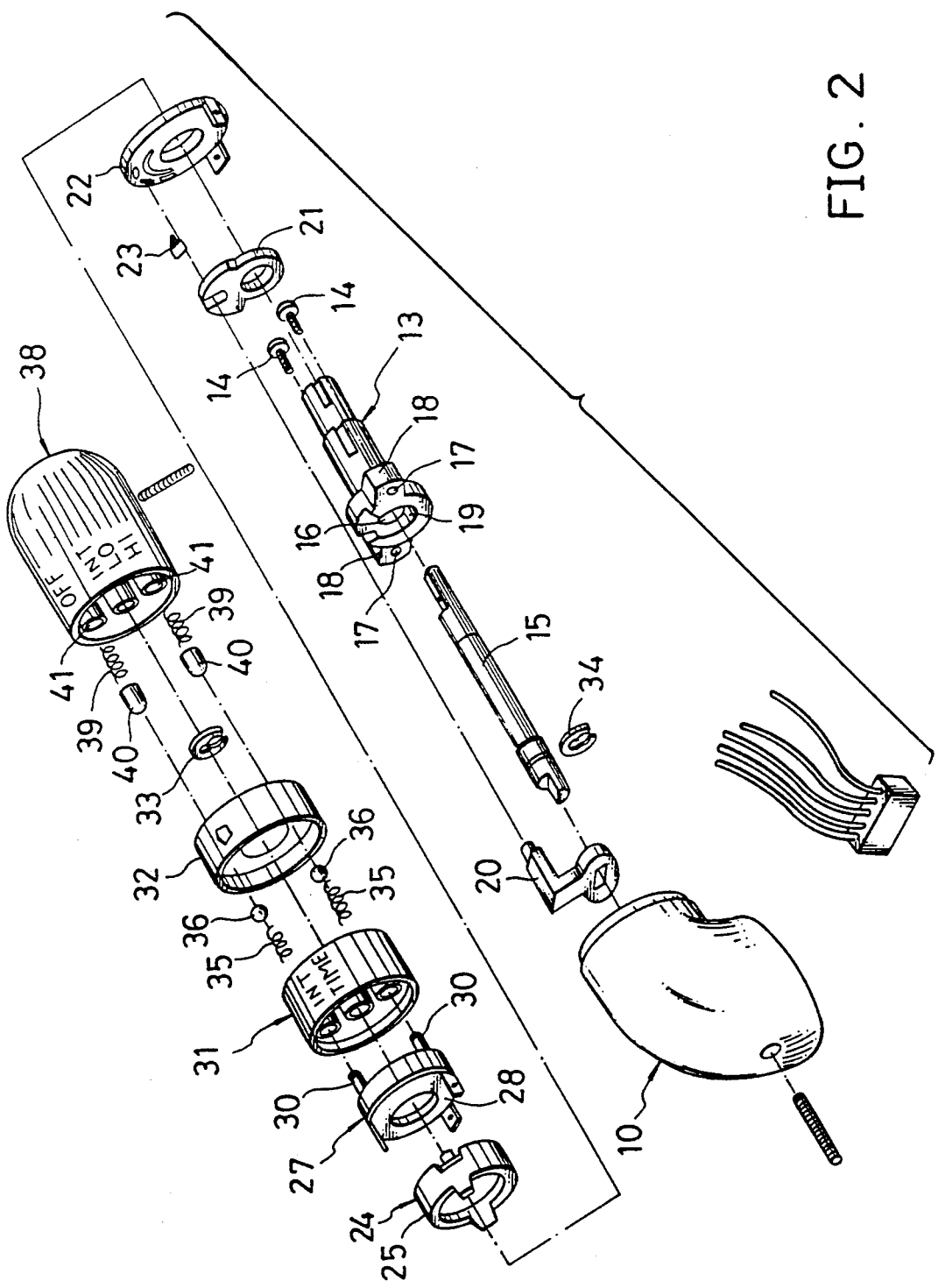
Figure 3:
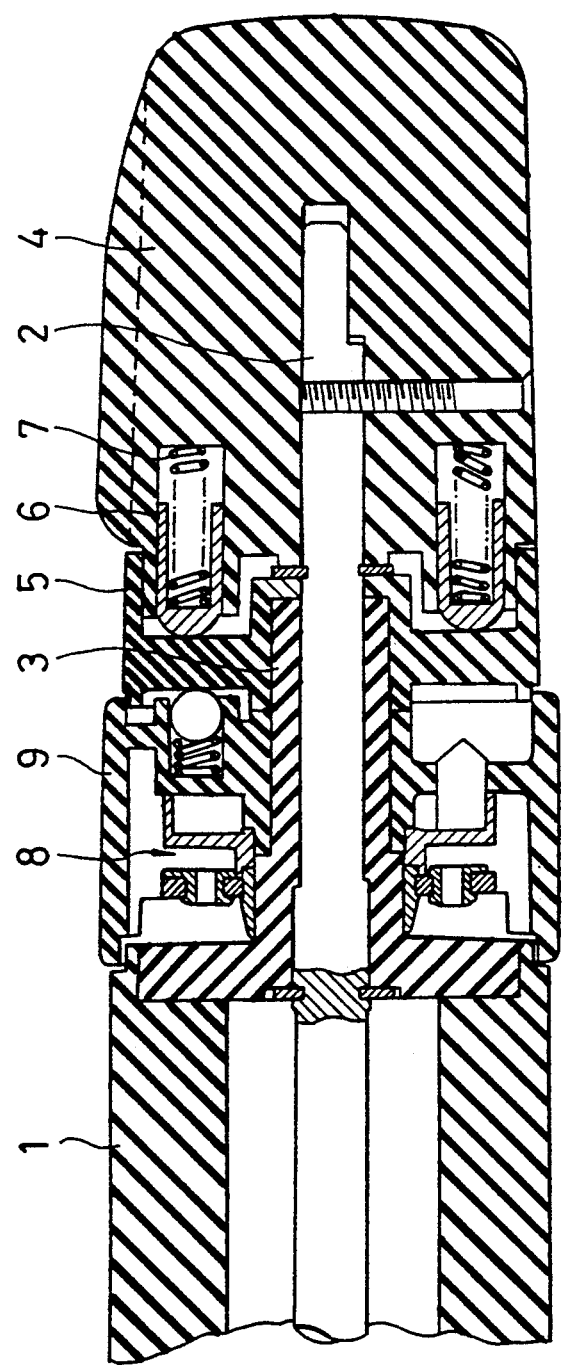
FIG. 3 is a longitudinal sectional view showing a conventional wiper switch.

FIG. 1 is a longitudinal sectional view of a lever switch according to the present invention, and FIG. 2 is an exploded perspective view.

In these figures, reference numeral 10 denotes a base. The base 10 has a convergent columnar shape and is bent into a <- shape. The base 10 is formed in one end thereof with a mounting hole 11 in which is fitted a mounting shaft projected from a mounting base not shown. The base 10 is provided in the other end with a round recess 12. A hollow bearing body 13 is mounted on the bottom of the round recess 12 by means of screws 14, 14. This hollow bearing body 13 defines a through-hole 16 in which is supported a rotational shaft 15 inserted therein. Support members 18, 18 provided with holes 17, 17 which receive the screws 14, 14 are disposed on a first end of the hollow bearing body. A portion of the first end is removed to provide a space 19 between the hollow bearing body 13 and the bottom of the round recess 12. A first end of the rotational shaft 15, inserted into a the through-hole 16, is projected into the space 19, and a lever member 20 is fitted in the space 19 to the first end of rotational shaft 15 so as to be integrally rotated with the rotational shaft 15. This lever member 20 is formed into an L-shape and can be pivotally moved within the space 19, the lever member 20 having free end extended toward the central portion of the rotational shaft 15. The free end of the lever member 20 is engaged with a first slider receiver 21 for a front wiper switching switch mounted in the outer periphery of the hollow bearing body 13. The first slider receiver 21 is loosely fitted in the outer periphery of the hollow bearing body 13, a printed circuit substrate 22 formed with a switching pattern is fixedly mounted in the outer periphery of the hollow bearing body 13, and a first slider 23 which slidably moves on the pattern of the printed circuit substrate 22 is fitted in the first slider receiver 21.

A holder 24 is composed of an outer ring 25 fitted inside an inner surface of the round recess 12 and an inner ring 26 fitted on the outer periphery of the hollow bearing body 13. The outer ring 25 has one edge placed in contact with the printed circuit substrate 22 while the other edge is placed in contact with an interval time setting variable resistor 27. This variable resistor 27 is composed of a base plate 28 and a second slider receiver 29 on which is fitted a second slider 51 which slidably moves on the pattern of the base plate 28. The second slider receiver 29 has an engaging projection 30 projected therefrom, which is in turn extended through an interval time setting knob (INT knob) 31 loosely fitted on the outer periphery of the hollow bearing body 13. As a result, the second slider receiver 29 is rotated as the INT knob 31 rotates.

A fixed knob 32 is unrotatably fitted on the extreme end of the hollow bearing body 13, a portion of the rotational shaft 15 extends through the fixed knob 32, and a detent E-shaped washer 33 is fitted in the projected rotational shaft 15 adjacent a second end. A further E-shaped washer 34 is fitted on the rotational shaft 15 adjacent the first end. These E-shaped washers 33 and 34 prevent the rotational shaft 15 from being disengaged from the hollow bearing body 13. The fixed knob 32 prevents the switch, variable resistor and the like fitted in the outer periphery of the hollow bearing body 13 from being disengaged.

Between the fixed knob 32 and the INT knob 31 is provided a click mechanism for selecting and locating the INT knob 31 at a predetermined rotational angle. The click mechanism is composed of a first cam crown 52 provided on one surface of the fixed knob 32 and a clicking steel ball 36 placed in pressure contact with the first cam crown 52 by means of a spring 35, the steel ball 36 being received in a receiving hole 37 provided in the INT knob by compressing the coil spring 35.

A knob for a front wiper (front knob) 38 is fitted in an opening formed by fixed knob 32 and screwed on the second end of the rotational shaft 15, which is projected form the fixed knob 32, both the front knob and rotational shaft 15 being integrally rotated. This front knob 38 is located at positions, for example, OFF, INT, LO and HI, by the click mechanism. This click mechanism is composed of a second cam crown 53 provided on the other surface of the fixed knob 32, and a clicking pin 40 placed in pressure contact with the second cam crown 53 by means of a coil spring 39, the clicking pin 40 being received in a receiving hole 41 provided in the front knob 38 by compressing the coil spring 39.

In the thus structured embodiment, the front knob 38 is rotated to assume the positions, OFF, INT, LO and HI. With the rotation of the knob 38, the slider receiver 21 caused to rotate through the rotation of the rotational shaft 15 and the lever member 20 to switch the switch whereby the selected wiper setting is operated.

In the case where INT is selected, the INT knob 31 may also be rotated to adjust the period between intermittent wiper operations. When the INT knob 31 is rotated, it is selected at a predetermined rotational angle as previously mentioned, and when the INT knob 31 is rotated, the resistance of the variable resistor 27 is varied through the rotation of second slider receiver 29 by means of the engaging projections 30, which extend through and engage the INT knob 31, which in turn moves the second slider over the pattern of the base plate 28, thereby adjusting the period between intermittent wiper operations.

In the above-described embodiment, the front wiper switch portion is encased within the base 10, and therefore, the whole lever switch can be miniaturized. Even in a case where the switch circuit for a wiper cannot be disposed in the mounting base of the base 10, the wiper switch can be installed.

Moreover, since the bearing portion of the rotational shaft 15 can be extended, the operation feeling of the rotational shaft 15 can be enhanced.

Furthermore, since the holder 24 is disposed on the outer periphery of the hollow bearing body 13, the central portion of the hollow bearing body 13 is secured to the base 10, and the extreme end of the hollow bearing portion 13 is not dislocated so that the INT knob 31 comes into contact with the base 10 to prevent the feeling of smooth, solid operation from becoming loose. In addition, since the length of the rotational shaft 15 is shortened, the force applied to operate the lever switch becomes smaller, therefore the force on the screws 14, 14 used to mount the hollow bearing body 13 to the base 10 is reduced, thus increasing the strength of the entire lever switch.

As described above, according to the present invention, the product can be miniaturized, and the number of possible mounting positions, etc. is increased.

What is claimed is:

1. A lever switch comprising a base, a hollow bearing body mounted and secured to said base, a rotational shaft having a first end inserted into and rotatably supported in said hollow bearing body, a lever member fixedly mounted on said first end and having an arm bent to point along said rotational shaft, a slider receiver operably connected to said arm, said slider receiver being rotatably fitted on an outer periphery of said hollow bearing body so that said slider receiver is rotated upon rotation of said lever member, a slider disposed on said slider receiver, a first rotary switch knob fixedly mounted on a second end of said rotational shaft, a fixed knob portion fixedly mounted on the outer periphery of said hollow bearing body, a first selection mechanism provided between said fixed knob portion and said first rotary switch knob, a second rotary switch knob rotatably fitted on the outer periphery of said hollow bearing body between said fixed knob and said slider receiver, a second selection mechanism provided between said second rotary switch knob and said fixed knob portion, and a variable resistor provided on the outer periphery of said hollow bearing body between said second rotary switch knob and said slider receiver and being operated in association with the rotational operation of said second rotary switch knob.

2. An improved lever switch including:
a base for mounting to a steering column;
support means fixedly connected to said base, said support means defining a through-hole;

a rotational shaft rotatably disposed in said throughhole, said rotational shaft having a first end disposed adjacent said base and a second end projecting from said support means;

a first rotary switch knob fixedly connected to said second end of said rotational shaft; and a second rotary switch knob rotatably disposed on said support means;

the improvement comprising a first variable resistor rotary switch mechanism operably coupled to said first end of said rotational shaft, and a second variable resistor rotary switch mechanism operably connected to said first rotary switch knob such that said first and second variable resistor rotary switch mechanisms are disposed between said base and said second rotary switch knob.

3. An improved lever switch of claim 2 wherein said first and second variable resistor rotary switch mechanisms are located between said first and second ends of said rotational shaft.

4. An improved lever switch of claim 3 wherein said support means comprises a hollow bearing body having a first end connected to said base, a portion of said first end defining a space between base and said hollow bearing body.

5. An improved lever switch of claim 4 wherein said first variable resistor rotary switch mechanism comprises:

a lever member fixedly connected to said first end of said rotational shaft, said lever member rotatably disposed in said space, said lever member having an arm;

a slider receiver rotatably disposed on said hollow bearing body and operably connected to said arm;

a first slider fixedly disposed on said first slider receiver; and a printed circuit substrate fixedly connected to said hollow bearing body, said printed circuit substrate having a surface in sliding contact with said slider;

wherein when said rotational shaft is rotated, said lever mechanism rotates said slider holder to slide said first slider across said surface of said printed circuit 6. An improved switch of claim 4 wherein said second variable resistor rotary switch mechanism comprises:

a second slider receiver rotatably disposed on said hollow bearing body and operably coupled to said second rotary switch knob;

a second slider fixedly disposed on said second slider receiver; and a base plate fixedly disposed on said hollow bearing body, said base plate having a surface in sliding contact with said slider;

wherein when said second variable resistor rotary switch device is rotated about said hollow bearing body, said second slider receiver rotates to slide said second slider across the surface of said printed circuit substrate.

* * * * *

UNITED STATES PATENT AND TRADEMARK OFFICE
CERTIFICATE OF CORRECTION

PATENT NO.   :   5,107,243
DATED        :   April 21, 1992
INVENTOR(S)  :   Takuya Maeda It is certified that error appears in the above-identified patent and that said Letters Patent is hereby corrected as shown below:

Claim 5 should read as follows:

Col. 6 line 14 after "circuit" insert --substrate.--

Abstract

Line 5 - delete "rotatable" insert --rotatably-- .

Signed and Sealed this

Third Day of August, 1993

Attest:

MICHAEL K. KIRK

Attesting Officer          Acting Commissioner of Patents and Trademarks